United States Patent
Kuroki

(10) Patent No.: US 10,049,687 B2
(45) Date of Patent: Aug. 14, 2018

(54) AUDIO PROCESSING APPARATUS AND AUDIO PROCESSING METHOD

(71) Applicant: CANON KABUSHIKI KAISHA, Tokyo (JP)

(72) Inventor: Tomohiko Kuroki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 4 days.

(21) Appl. No.: 15/421,084

(22) Filed: Jan. 31, 2017

(65) Prior Publication Data

US 2017/0221503 A1 Aug. 3, 2017

(30) Foreign Application Priority Data

Feb. 2, 2016 (JP) .................................. 2016-018417

(51) Int. Cl.
H04B 15/00 (2006.01)
G10L 21/0264 (2013.01)
(Continued)

(52) U.S. Cl.
CPC ...... G10L 21/0264 (2013.01); G06K 9/00785 (2013.01); G08G 1/0116 (2013.01); G08G 1/04 (2013.01); G08G 1/052 (2013.01); G08G 1/065 (2013.01); G10L 21/0216 (2013.01); G10L 25/51 (2013.01)

(58) Field of Classification Search
CPC . G10L 21/0264; G10L 21/0216; G10L 25/51; G10L 15/25; G10L 25/48; G06K 9/00785; G06K 9/40; G06K 9/00335; G08G 1/0116; G08G 1/04; G06T 2207/10016; G06T 5/002; G06T 2207/20012; G06T 5/50; H04N 19/117; H04N 19/85; H04N 5/357

USPC ........ 348/143, 241; 382/254, 261, 275, 276; 381/94.2, 58, 71.11, 94.1, 94.7, 71.12
See application file for complete search history.

(56) References Cited

U.S. PATENT DOCUMENTS

| 9,767,828 B1* | 9/2017 | Velusamy ................ H04B 3/23 |
| 2012/0230506 A1* | 9/2012 | Pan ...................... G10K 11/178 |
| | | 381/71.11 |
| 2016/0150338 A1* | 5/2016 | Kim ........................ G08B 1/08 |
| | | 381/58 |

FOREIGN PATENT DOCUMENTS

| CN | 103150903 | * | 6/2013 |
| JP | 200684928 A | | 3/2006 |
| JP | 200949885 A | | 3/2009 |

* cited by examiner

Primary Examiner — Norman Yu
(74) Attorney, Agent, or Firm — Canon U.S.A., Inc. IP Division

(57) ABSTRACT

An audio processing apparatus includes a noise component extraction unit, a removal unit, and a detection unit. The noise component extraction unit performs noise component extraction processing for extracting a noise component from sound data picked up by a sound pickup apparatus corresponding to an imaging apparatus. The removal unit removes the noise component from the sound data. The detection unit detects a condition of an imaging target from an image captured by the imaging apparatus. The noise component extraction unit performs learning processing for adapting the noise component extraction processing to the sound data picked up by the sound pickup apparatus. The noise component extraction unit changes a speed at which the noise component extraction processing is adapted to the sound data in the learning processing according to the condition of the imaging target that is detected by the detection unit.

14 Claims, 10 Drawing Sheets

(51) Int. Cl.
G06K 9/00 (2006.01)
G08G 1/01 (2006.01)
G08G 1/04 (2006.01)
G10L 21/0216 (2013.01)
G08G 1/052 (2006.01)
G08G 1/065 (2006.01)
G10K 11/16 (2006.01)
G10L 25/51 (2013.01)

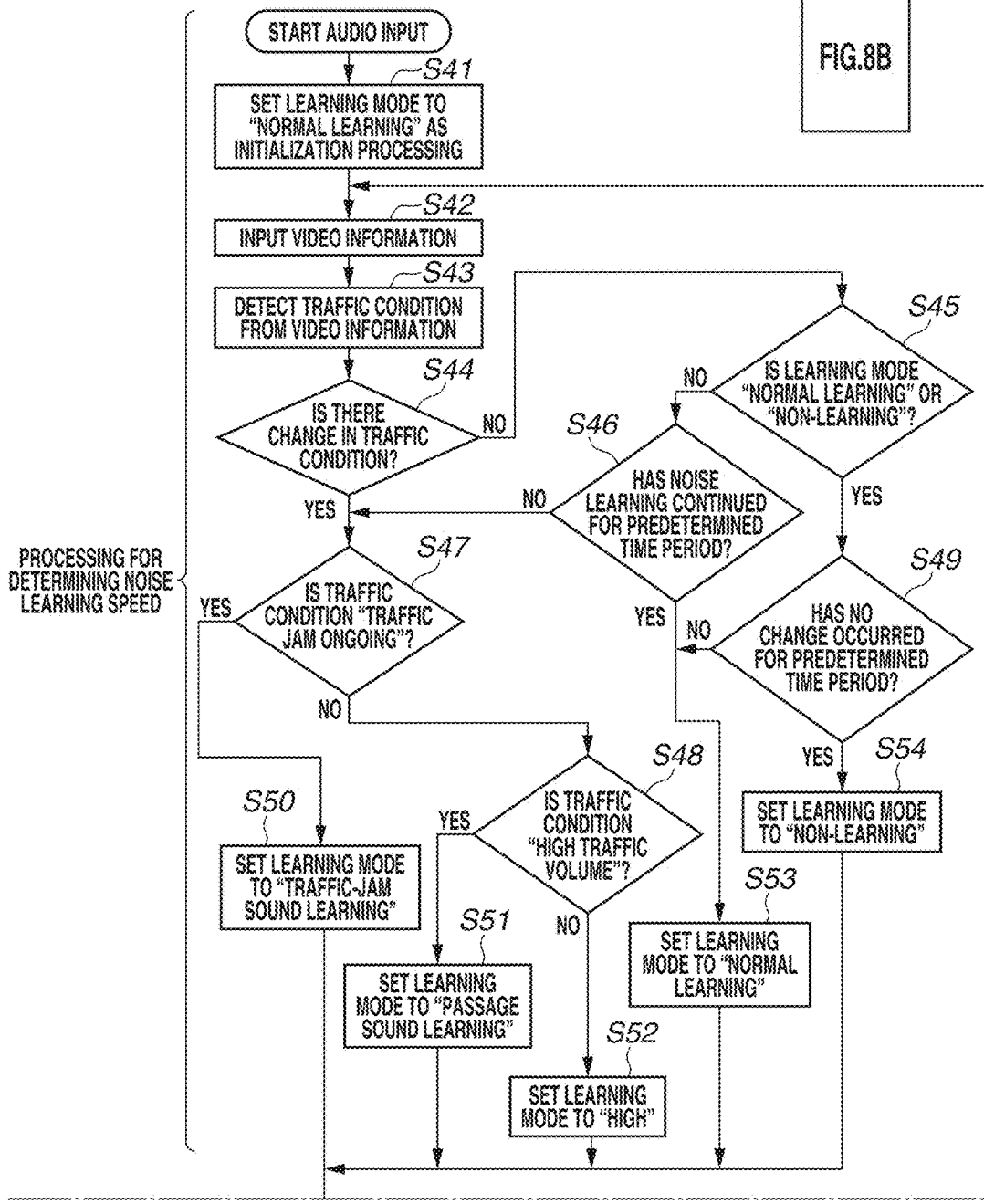

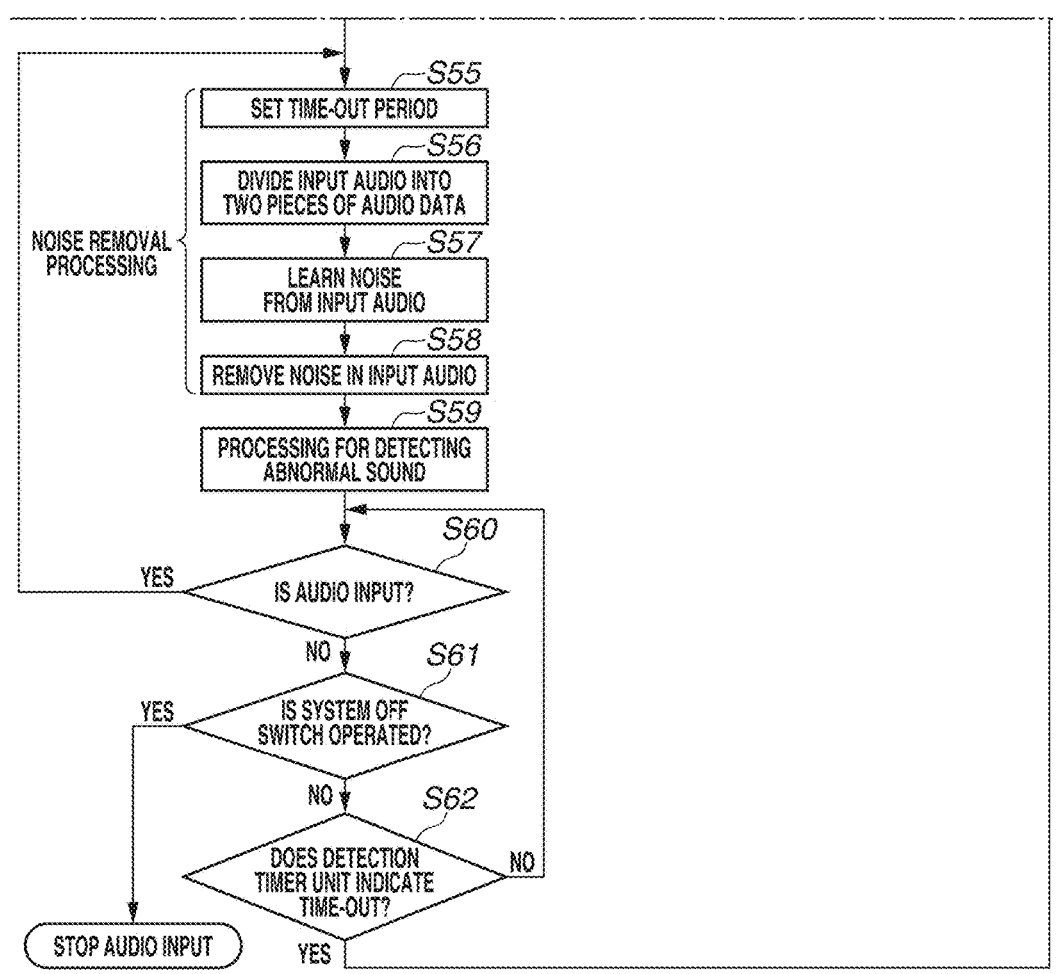

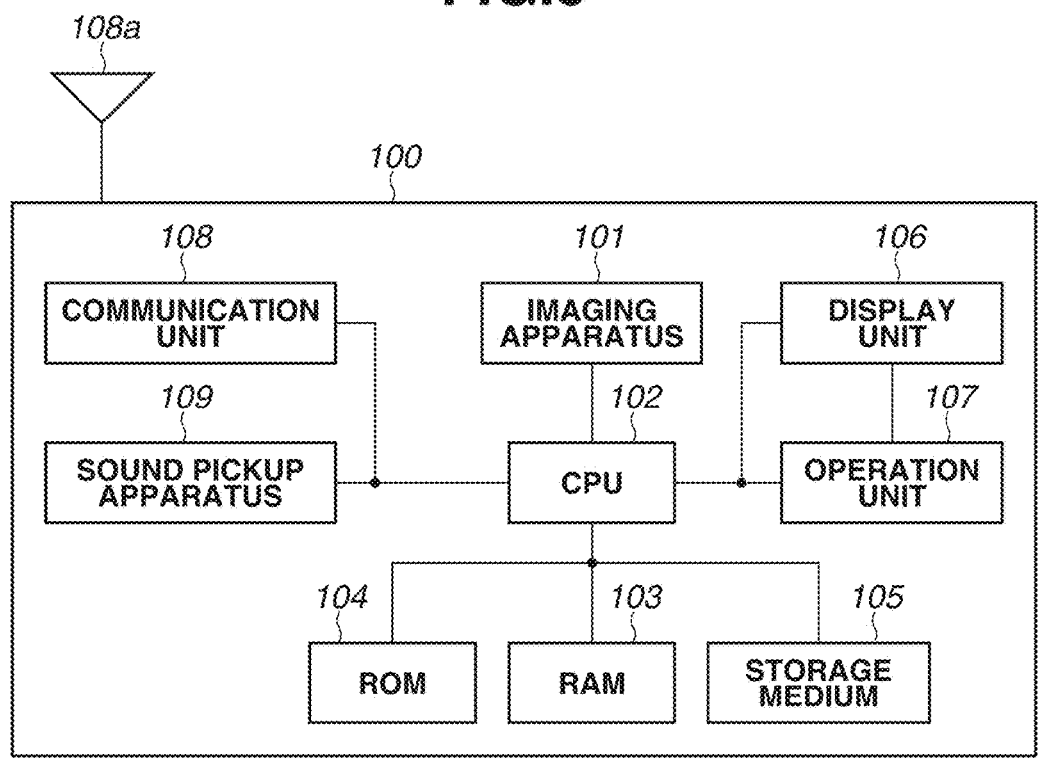

AUDIO PROCESSING APPARATUS AND AUDIO PROCESSING METHOD

BACKGROUND OF THE INVENTION

Field of the Invention

The disclosed information relates to an audio processing apparatus and an audio processing method.

Description of the Related Art

Noise reduction (NR) techniques are known as signal processing techniques for canceling or reducing noise contained in a signal of audio, a video image, and the like. One conventional audio NR technique is a method called spectral subtraction, which removes a removal target sound by subtracting a frequency component of audio that is the removal target by an amount corresponding to a gain of each thereof. The spectral subtraction is widely known as a basic technique of the NR techniques.

One NR technique developed by applying this technique is noise learning NR. The noise learning NR automatically learns a frequency region and a subtraction amount of a background sound or constantly occurring audio with use of an autocorrelation or an adaptive filter, and removes a frequency component thereof.

For example, a technique discussed in Japanese Patent Application Laid-Open No. 2009-49885 calculates a frequency characteristic contained in an input sound with use of an autocorrelation function, and determines whether the input sound is audio (voice) or surrounding noise. Then, the technique discussed in Japanese Patent Application Laid-Open No. 2009-49885 calculates an average value of the surrounding noise as an average noise, and subtracts the average noise from the input sound, thereby removing a surrounding noise component.

According to the technique discussed in Japanese Patent Application Laid-Open No. 2009-49885, a speed from the calculation of the frequency characteristic of the input sound to the removal of the surrounding noise component (i.e., a noise learning speed) is constant regardless of the surrounding noise. However, the surrounding noise may change depending on a time period of a day or the like. Therefore, the employment of the technique discussed in Japanese Patent Application Laid-Open No. 2009-49885 cannot achieve an accurate removal of the surrounding noise under such an environment that a level of the surrounding noise (a noise environment) changes depending on a time period of day.

SUMMARY OF THE INVENTION

In an example, an audio processing apparatus is capable of accurately carrying out the noise removal even when the noise environment changes at the time of the noise removal from the audio.

According to an aspect of the present invention, an audio processing apparatus includes a noise component extraction unit configured to perform noise component extraction processing for extracting a noise component from sound data picked up by a sound pickup apparatus corresponding to an imaging apparatus, a removal unit configured to remove the noise component from the sound data, and a detection unit configured to detect a condition of an imaging target from an image captured by the imaging apparatus, wherein the noise component extraction unit performs learning processing for adapting the noise component extraction processing to the sound data picked up by the sound pickup apparatus, and wherein the noise component extraction unit changes a speed at which the noise component extraction processing is adapted to the sound data in the learning processing according to the condition of the imaging target that is detected by the detection unit.

Further features of the present invention will become apparent from the following description of embodiments with reference to the attached drawings.

BRIEF DESCRIPTION OF THE DRAWINGS

FIG. 8 (consisting of FIGS. 8A and 8B) is a flowchart illustrating a noise removal procedure performed by an abnormality monitoring system according to a third embodiment.

FIG. 9 is a block diagram illustrating a hardware configuration of the abnormality monitoring system.

DESCRIPTION OF THE EMBODIMENTS

Figure 1:
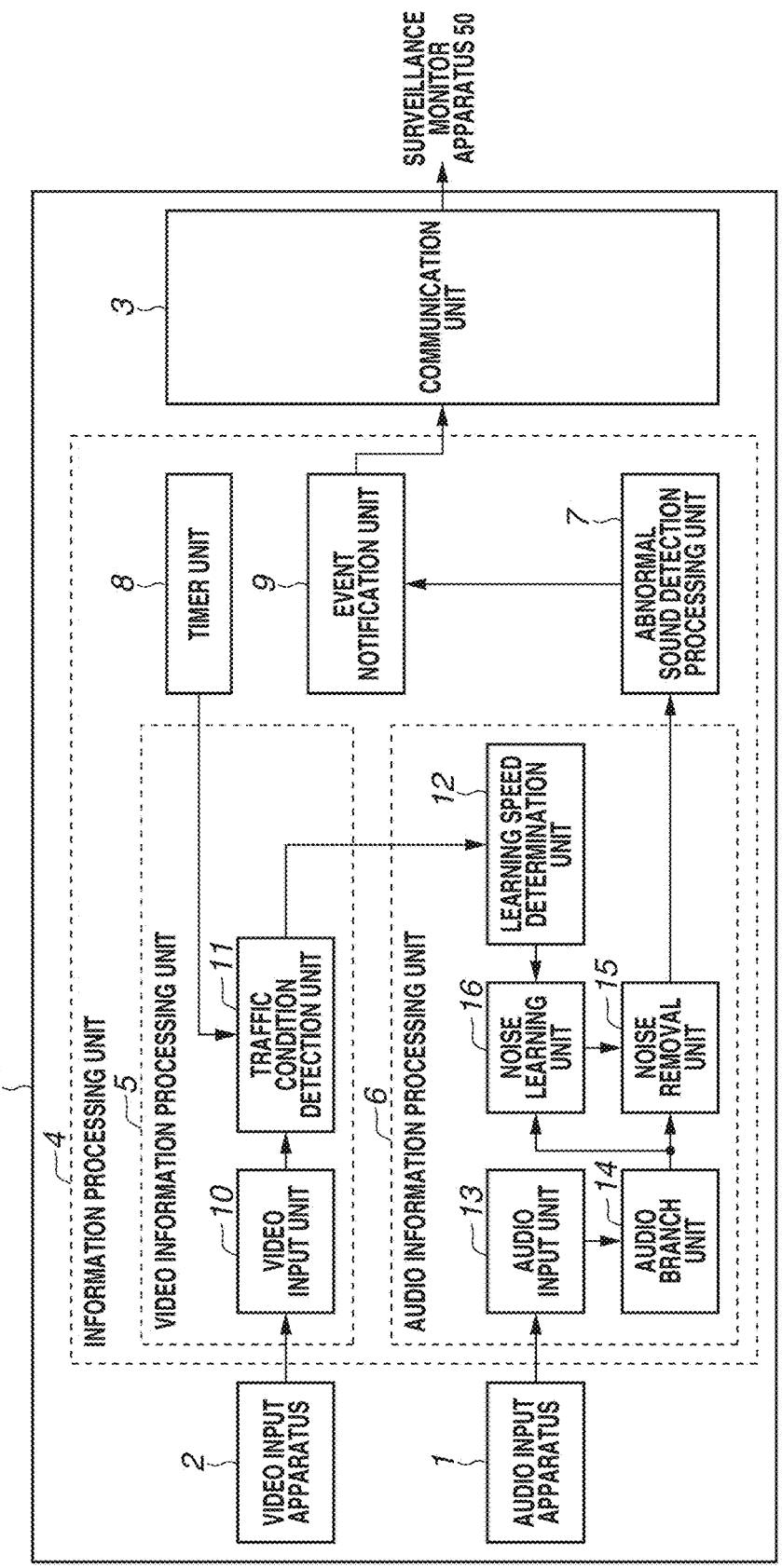
FIG. 1 is a functional block diagram of an abnormality monitoring system according to a first embodiment.

In the following description, embodiments will be described in detail with reference to the accompanying drawings. The embodiments that will be described below are merely one example as how they can be realized, and shall be arbitrarily modified or changed depending on a configuration and various kinds of conditions of an apparatus to which the information is applied. Thus, the disclosed information is in no way limited to the following embodiments.

When a noise learning speed is constant regardless of surrounding noise, the surrounding noise cannot be accurately removed under such an environment that a level of the surrounding noise (a noise environment) changes depending on a time period of a day or the like. For example, during a time period of a day in which the noise environment frequently changes, the noise learning may be in some cases unable to follow the change in the noise environment and thus result in a failure to completely remove the noise, unless the learning speed is sped up. On the other hand, during a time period of a day in which the noise environment does not change so much, the learning speed does not have to be sped up. For example, slowing down the learning speed can reduce a possibility that necessary audio, other than the background noise, may be unintentionally learned and removed. In the embodiments, a noise removal apparatus capable of carrying out the noise removal with high accuracy will be described in light of such a point. Further, a monitoring system including such a noise removal apparatus will also be described.

In other words, the learning speed in each of the embodiments can be defined in the following manner. Specifically, the learning speed means a speed at which a filter coefficient of an adaptive filter for extracting a noise component is adapted to current sound data from sound data picked up by a sound pickup apparatus. Further, a process for learning the noise may also be referred to as noise profiling.

<Overview of Abnormality Monitoring System>

An abnormality monitoring system including a noise removal apparatus according to a first embodiment will be described with reference to FIGS. 1 to 4. The noise removal apparatus is an apparatus that processes audio by the noise removal, and therefore can be referred to as an audio processing apparatus.

First, a functional configuration of an abnormality monitoring system 100 will be described with reference to a block diagram (a functional configuration diagram) of the abnormality monitoring system 100 illustrated in FIG. 1.

The abnormality monitoring system 100 according to the present embodiment is a system that monitors an abnormality in a traffic condition (a traffic abnormality) at an imaging site (a predetermined imaging range). The abnormality monitoring system 100 is connected to an external surveillance monitor apparatus 50. If a collision sound, a sound when glass is broken, an explosion sound, or the like has occurred at the imaging site, the abnormality monitoring system 100 detects this impact sound or the like as an abnormal sound (a specific sound), and issues an event notification to the surveillance monitor apparatus 50 (notifies the surveillance monitor apparatus 50 of the occurrence of the abnormal sound). In each of the embodiments, assume that the noise is a background sound other than a sound that is a detection target (the abnormal sound in each of the embodiments). In the following description, the background sound may also be referred to as the background noise.

The abnormality monitoring system 100 is a system that monitors the traffic condition in which the background noise may occur, and therefore includes a mechanism for removing constantly occurring background noise (a noise removal function or a noise removal apparatus) to allow the abnormal sound to be detected with further high accuracy.

The abnormality monitoring system 100 includes an audio input apparatus 1, a video input apparatus 2, a communication unit 3, and an information processing unit 4. The abnormality monitoring system 100 is connected to the surveillance monitor apparatus 50 via the communication unit 3. The audio input apparatus 1 acquires audio at the imaging site, and inputs this audio to the information processing unit 4. The audio input apparatus 1 is, for example, a sound pickup apparatus, such as a microphone. The video input apparatus 2 is, for example, a camera apparatus capable of capturing (imaging) a moving image. The video input apparatus 2 images the predetermined imaging range and generates video data. A condition in the imaging range (the traffic condition in the present embodiment) can be acquired from the video data. The audio input apparatus 1 is a sound pickup apparatus corresponding to the imaging apparatus that captures the video data. This sound pickup apparatus does not necessarily have to be provided inside the imaging apparatus, and may be provided outside the imaging apparatus. Further, the sound pickup apparatus does not necessarily have to be an apparatus that picks up only a sound in a direction toward the imaging range imaged by the imaging apparatus. For example, the sound pickup apparatus may be an apparatus that picks up a sound around the imaging apparatus including the direction toward the imaging range with use of a microphone having wide directivity. The disclosed information also can be applied to such usage that the system detects an abnormal sound such as a scream from the sound picked up by the sound pickup apparatus, and directs the imaging apparatus toward this abnormal sound.

The information processing unit 4 includes a video information processing unit 5, an audio information processing unit 6, an abnormal sound detection processing unit 7, a timer unit 8, and an event notification unit 9. The noise removal function is carried out by the video information processing unit 5 and the audio information processing unit 6, whereby the noise removal apparatus included in the abnormality monitoring system 100 according to the present embodiment includes the video information processing unit 5 and the audio information processing unit 6.

The video information processing unit 5 receives an output signal of the video input apparatus 2 (the input video image from the video input apparatus 2) and an output signal of the timer unit 8, performs video processing on the input video image, and transmits the processed signal (video image) to the audio information processing unit 6.

The audio information processing unit 6 receives an output signal of the audio input apparatus 1 (the input audio from the audio input apparatus 1) and the output signal of the video information processing unit 5, and carries out the noise removal processing on the input audio. The audio subjected to the noise removal (an output signal of the audio information processing unit 6) is transmitted to the abnormal sound detection processing unit 7.

The abnormal sound detection processing unit 7 receives the output signal of the audio information processing unit 6, and detects and processes the abnormal sound. A signal generated from this processing is transmitted to the event notification unit 9.

The timer unit 8 determines a frequency at which the video information processing unit 5 detects the video image, and notifies the video information processing unit 5 of the detected frequency.

The event notification unit 9 receives the output signal of the abnormal sound detection processing unit 7, generates the notification event, and transmits this notification event to the communication unit 3. The communication unit 3 transmits the notification event received from the event notification unit 9 to the surveillance monitor apparatus 50.

The surveillance monitor apparatus 50 includes a display unit, an alarm issue unit, and the like. The surveillance monitor apparatus 50 displays the detection of the abnormal sound on the display unit with use of characters and images upon receiving the notification event from the communication unit 3. At this time, the surveillance monitor apparatus 50 may issue an alarm sound.

<Video Information Processing Unit>

The video information processing unit 5 includes a video input unit 10 and a traffic condition detection unit 11. The video input unit 10 receives the input video image supplied from the video input apparatus 2, and holds the received input video image. The traffic condition detection unit 11 receives this input video image from the video input unit 10, and detects a current traffic condition from this input video image. More specifically, the traffic condition detection unit 11 detects the number of cars (vehicles) displayed in the video image of the video input apparatus 2, a speed at which each of the cars passes, and a frequency at which the cars pass per unit time, based on the video image input from the video input unit 10. Then, the traffic condition detection unit 11 determines (detects) the traffic condition from a combination of the number of cars, the speed at which each of the cars passes, and the frequency at which the cars pass, and outputs this traffic condition to the audio information processing unit 6 (more specifically, to a learning speed determination unit 12, which will be described below).

An object detection method using template matching or the like is employed to detect the cars from the video image of the video input apparatus 2. The number of cars in the video image can be detected (acquired) by this object detection method. Further, a detection method using so-called passage detection or the like is employed as a method for acquiring the speed at which each of the cars passes and the frequency at which the cars pass. The template matching and the passage detection are known techniques, and therefore detailed descriptions thereof will be omitted herein.

<Background Noise>

Figure 2:
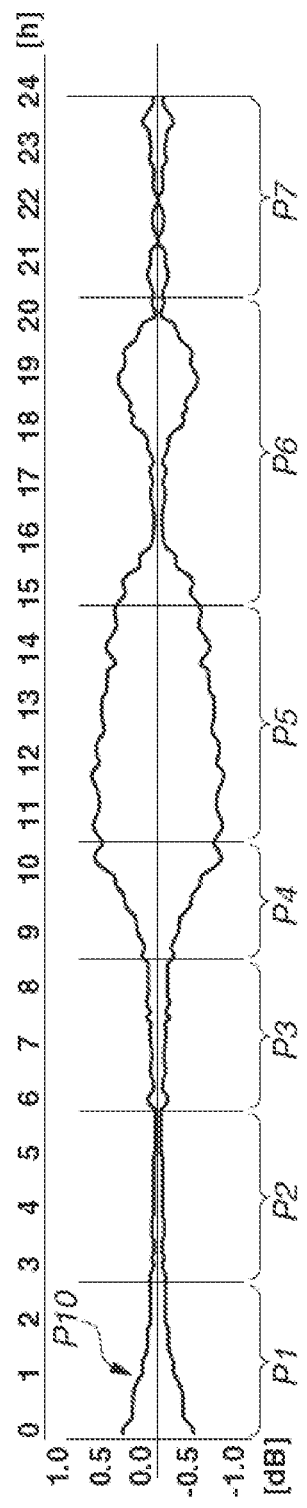
FIG. 2 is an audio waveform chart of background noise at a traffic site according to the first embodiment.

FIG. 2 illustrates an example of an audio waveform chart (an audio waveform P10) of the background noise at the imaging site. A vertical axis and a horizontal axis in FIG. 2 represent an amplitude (a unit thereof is dB (decibel)) and a time (a unit thereof is hour), respectively. The audio waveform P10 indicates how the background noise is changed during twenty-four hours. In the present embodiment, the audio waveform P10 is divided into seven segments P1 to P7. The segment P1 indicates the background noise during a time period from 0:00 to 2:30. The segment P2 indicates the background noise during a time period from 2:30 to 5:30. The segment P3 indicates the background noise during a time period from 5:30 to 8:30. The segment P4 indicates the background noise during a time period from 8:30 to 10:30. The segment P5 indicates the background noise during a time period from 10:30 to 14:30. The segment P6 indicates the background noise during a time period from 14:30 to 20:30. The segment P7 indicates the background noise during a time period from 20:30 to 24:00.

As illustrated in FIG. 2, the background noise at the imaging site may largely be changed as in the segment P4, and may hardly be changed as in the segment P2 depending on a time period of a day due to, for example, a change in a traffic volume at this site. In other words, how the background noise is changed at the imaging site is different depending on a time period of a day.

<Detection of Traffic Condition>

Figure 3:
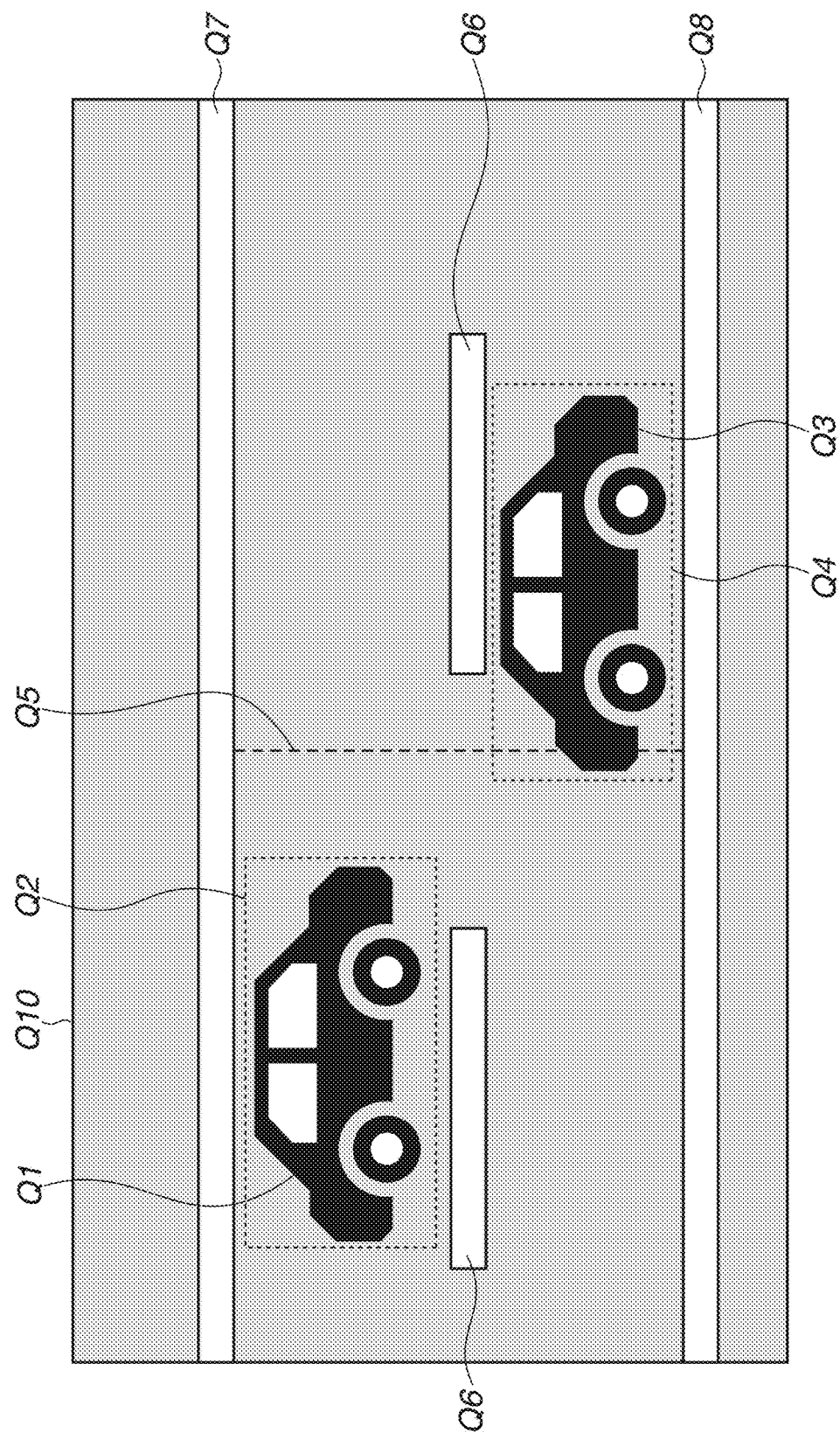
FIG. 3 is a diagram illustrating a method for detecting a traffic condition according to the first embodiment.

FIG. 3 illustrates an example in which a road where cars frequently pass is imaged, as an example of the detection of the traffic condition. This road is a road having one lane for each direction. A video image Q10 is the video image input from the video input unit 10 to the traffic condition detection unit 11 of the video information processing unit 5. A passage line Q5 is set in a direction crossing the road in the video image Q10. Then, the traffic condition detection unit 11 detects the number of cars by detecting a car Q1 and a car Q3 like a sectional video image Q2 and a sectional video image Q4, respectively, from the video image Q10, and counting the number thereof. A center line Q6 is provided on the road. The car Q1 is a car traveling from the left side to the right side in FIG. 3, and the car Q3 is a car traveling from the right side to the left side. A roadway and a sidewalk are separated from each other by lines Q7 and Q8. The passage line Q5 is a preset line on a camera screen of the video input apparatus 2.

When the sectional video images Q2 and Q4 of the cars (i.e., the cars Q1 and Q3) pass through the passage line Q5, the traffic condition detection unit 11 measures the speed at which each of the cars Q1 and Q3 passes and increments the number of passing cars as the passage detection of cars.

FIG. 3 illustrates the video image Q10 indicating the traffic condition at a certain time t. In practice, the video image Q10 is a moving image, and the sectional video images Q2 and Q4 travel in the video image Q10 to disappear from the video image Q10 as time advances, and a different car starts to appear (enter) in the video image Q10 after that. If the imaging site is kept in a state where five or more cars run at a passage speed of 20 km/h or lower for fifteen minutes or longer in such a moving image (the video image Q10), the traffic condition detection unit 11 determines that the traffic condition is in the middle of a traffic jam, and outputs a detection result "traffic jam ongoing". In the present embodiment, the traffic condition detection unit 11 determines that the traffic condition is in the middle of a traffic jam (outputs the detection result "traffic jam ongoing") even when there is a traffic jam only on one of the lanes.

If the number of cars that pass every fifteen minutes is 125 cars or more in a state not classified as "traffic jam ongoing", the traffic condition detection unit 11 determines that this traffic condition is a state having a high traffic volume, and outputs a detection result "high traffic volume". In other cases, the traffic condition detection unit 11 determines that the traffic condition is normal, and outputs a detection result "normal". The detection result output by the traffic condition detection unit 11 (a result of the detection of the traffic condition) is transmitted to the learning speed determination unit 12.

The learning speed determination unit 12 recognizes a change in the traffic condition of cars in the video image based on the result of the detection of the traffic condition that is received from the traffic condition detection unit 11, and determines (sets) an optimum noise learning speed. In the present embodiment, the learning speed determination unit 12 sets one of three speeds, "high", "intermediate", and "low" as the optimum noise learning speed. In other words, the learning speed determination unit 12 selects (sets) one of the three levels of learning speeds, "high", "intermediate", and "low" based on the result of the detection of the traffic condition that is received from the traffic condition detection unit 11. The level "high" is an abbreviation for a high speed, "intermediate" is an abbreviation for an intermediate speed, and "low" is an abbreviation for a low speed. In the present embodiment, assume that "intermediate" is set as an initial setting of the learning speed.

If the traffic condition is changed, the learning speed determination unit 12 determines that the surrounding noise environment is largely changed, and sets the learning speed to "high" (changes the learning speed from "intermediate" to "high"). The learning speed determination unit 12 sets the learning speed in this manner to allow the learning speed to follow the change in the noise environment by raising the learning speed.

If the traffic condition is not changed for a predetermined time period with the learning speed set to "high", the learning speed determination unit 12 determines that the change in the noise environment is subsided, and lowers the learning speed to "intermediate" (sets the learning speed back to the initial setting) to prevent excessive noise learning.

If the traffic condition is not changed for a predetermined time period with the learning speed set to "intermediate", the learning speed determination unit 12 determines that the imaging site is in a stationary state where the noise environment is hardly changed, and lowers the learning speed to "low". The learning speed determination unit 12 sets the learning speed in this manner to prevent audio other than the noise from being learned as much as possible.

A noise learning execution/non-execution determination unit may be provided instead of the learning speed determination unit 12 that sets the noise learning speed to any of the three levels (the high speed, the intermediate speed, and the low speed). The noise learning execution/non-execution determination unit determines (changes) only whether to carry out the noise learning according to the change in the traffic condition.

<Audio Information Processing Unit>

As illustrated in FIG. 1, the audio information processing unit 6 includes the learning speed determination unit 12, an audio input unit 13, an audio branch unit 14, a noise removal unit 15, and a noise learning unit 16.

The learning speed determination unit 12 determines the noise learning speed based on the traffic condition input from the traffic condition detection unit 11.

The audio input unit 13 receives the output signal of the audio input apparatus 1. In other words, the audio input unit 13 receives the audio data from the audio input apparatus 1. An output signal of the audio input unit 13 is transmitted to the audio branch unit 14.

The audio branch unit 14 divides the audio data input from the audio input unit 13 into completely identical two pieces of audio data. Between the two pieces of audio data, there is no difference in terms of a gain and a characteristic, and there is no deterioration, either. The audio branch unit 14 transmits one of the two pieces of audio data to the noise learning unit 16, and transmits the other of the two pieces of audio data to the noise removal unit 15.

The noise removal unit 15 removes a noise component input from the noise learning unit 16 from the audio data input from the audio branch unit 14. More specifically, the noise removal unit 15 performs noise removal processing on the audio data received from the audio branch unit 14 with use of a frequency component and a subtraction amount received from the noise learning unit 16. In the present embodiment, the noise removal unit 15 employs the spectral subtraction method as an algorithm for the noise removal. The spectral subtraction method employed in the noise removal is a known technique, and therefore a detailed description thereof will be omitted herein. The noise removal unit 15 transmits the audio data subjected to the noise removal to the abnormal sound detection processing unit 7.

The noise learning unit 16 derives the noise component by carrying out the noise learning on the audio. More specifically, the noise learning unit 16 defines the background noise and a constantly occurring sound as the noise from the audio data received from the audio branch unit 14, learns a component thereof (the noise component), and generates (derives) the frequency component and the subtraction amount at the time of the noise removal. The noise learning unit 16 transmits the frequency component and the subtraction amount at the time of the noise removal to the noise removal unit 15.

When the noise learning unit 16 according to the present embodiment performs the noise learning processing, first, the noise learning unit 16 analyzes frequency components in the audio. The noise learning unit 16 buffers the audio data input from the audio branch unit 14, carries out a discrete Fourier transform while sequentially dividing the audio data by every five seconds, and calculates frequency components and gains (a spectrum) contained in this divided audio.

Next, the noise learning unit 16 learns the frequency component of the constantly occurring audio. The noise learning unit 16 determines the frequency component and the subtraction amount at the time of the noise removal, by setting an adaptive filter for each of the calculated individual frequencies, sequentially inputting a gain value for each of them to gradually reach convergence, and calculating the gain value of the frequency component of the constantly occurring audio.

At this time, a convergence speed of the gain value is determined based on information indicating the noise learning speed (the high speed, the intermediate speed, or the low speed) supplied from the learning speed determination unit 12.

To describe it in more detail, changing the learning speed means, for example, changing a value of a coefficient of each adaptive filter to change the convergence speed.

In the present embodiment, the adaptive filter is set for each of the frequencies in the spectrum, whereby the learning speed can be set for each of the frequencies.

For example, performing fast Fourier transform (FFT) processing with a window size set to WindowSize=256 leads to setting 128 adaptive filters.

For example, if a sound of 100 hertz (Hz) is continuously input at 50 dB and is controlled so as to converge to 1 dB in ten seconds, the gain of the adaptive filter is first set in such a manner that the input sound reduces to one-fifth, and then is gradually converging to cause the input sound to reduce to one-fiftieth after ten seconds. After that, for example, when the input sound disappears (reduces to 0 dB), the gain gradually converges from the gain that causes the input sound to reduce to one-fiftieth to a gain that does not attenuate the input sound.

The value of the corresponding frequency (100 Hz in the present example) is subtracted with use of an output result of this adaptive filter, whereby the employment of the learning-type noise removal processing like the present embodiment results in that the sound of 100 Hz is gradually fading, and becomes inaudible with a sound corresponding to 50 dB subtracted therefrom finally after ten seconds. In this manner, changing the convergence speed (a speed at which the adaptive filter is adapted) speeds up or slows down the speed until the noise is removed and becomes inaudible. The adaptive filter is a known technique, and therefore a further description thereof will be omitted herein.

When the noise removal unit 15 transmits the audio data subjected to the noise removal to the abnormal sound detection processing unit 7, the abnormal sound detection processing unit 7 analyzes this audio data, and detects (determines) whether there is an abnormal sound, such as a crash sound, a sound when glass is broken, and an explosion sound, in this audio data. If detecting the abnormal sound, the abnormal sound detection processing unit 7 notifies the event notification unit 9 that the abnormal sound is detected (a determination result) (issues a notification indicating that the abnormal sound is detected).

Each of the functional blocks illustrated in FIG. 1 is stored as a computer program in a storage unit, such as a read only memory (ROM) 104 (FIG. 9), which will be described below, and is executed by a central processing unit (CPU) 102 (FIG. 9). At least a part of the functional blocks illustrated in FIG. 1 may be realized by hardware. In the case where a part of the functional blocks illustrated in FIG. 1 is realized by hardware, this can be achieved by, for example, using a predetermined compiler to thereby automatically generate a dedicated circuit on a field-programmable gate array (FPGA) from a program for realizing each step. Alternatively, the present embodiment may be configured in such a manner that a part of the functional blocks illustrated in FIG. 1 is realized as hardware by forming a gate array circuit in a similar manner to the FPGA. Alternatively, the present embodiment may be configured in such a manner that a part of the functional blocks illustrated in FIG. 1 is realized by an application specific integrated circuit (ASIC).
<Processing for Determining Noise Learning Speed and Noise Removal Processing>

Figure 4:
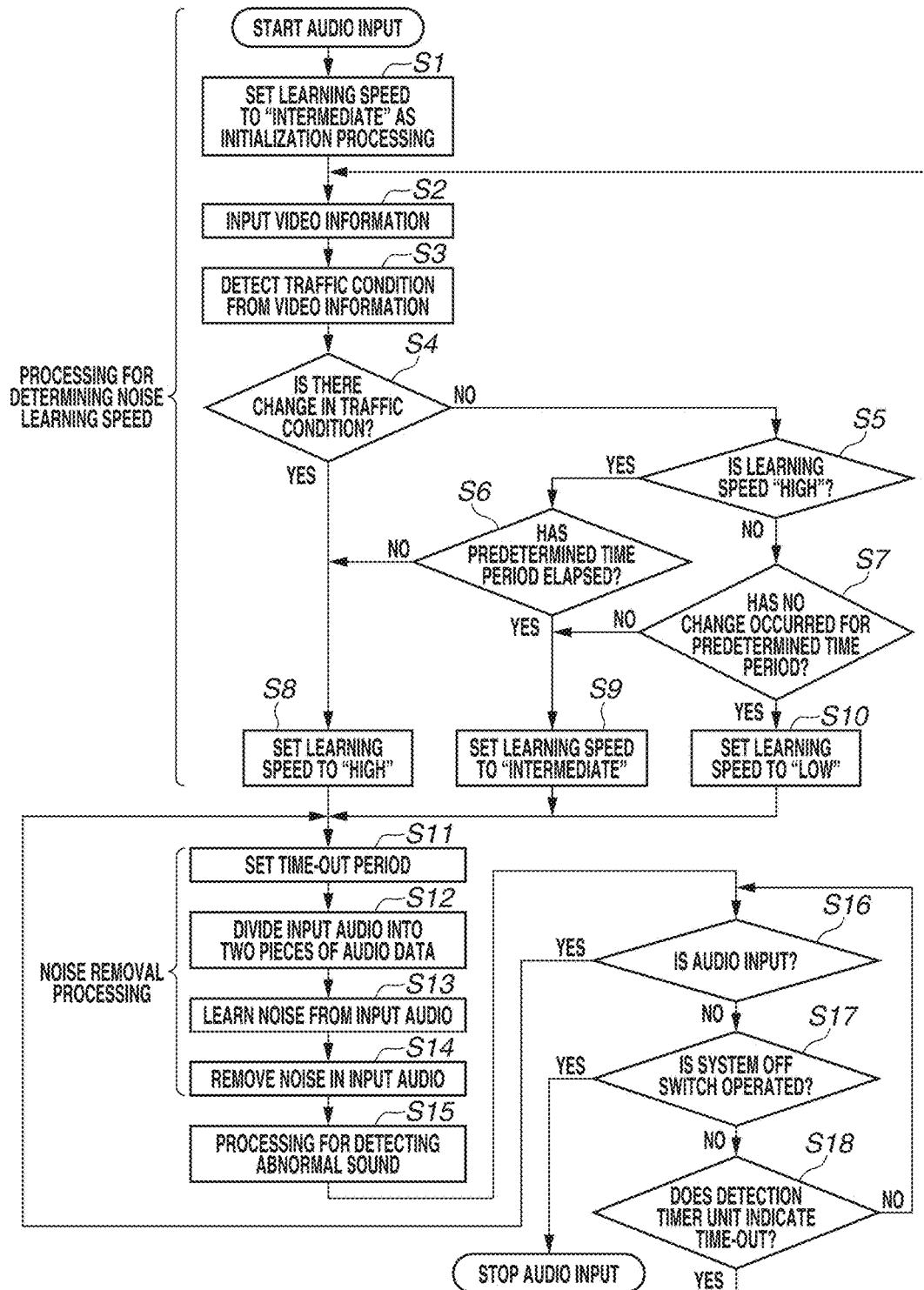
FIG. 4 is a flowchart illustrating a noise removal procedure performed by the abnormality monitoring system according to the first embodiment.

Next, a procedure of the noise removal processing performed by the abnormality monitoring system 100 illustrated in FIG. 1 will be described with reference to a flowchart illustrated in FIG. 4. The CPU 102 included in the abnormality monitoring system 100 executes the program stored in the ROM 104 or the like, by which the flowchart illustrated in FIG. 4 is processed.

In the present embodiment, the current traffic condition is determined based on the video image input from the video input apparatus 2, and the noise learning speed (the learning speed of the learning processing) is changed for the audio data input from the audio input apparatus 1 according to this determination (i.e., according to the current traffic condition). The flowchart illustrated in FIG. 4 is started when the audio data is input from the audio input apparatus 1 to the audio information processing unit 6.

When the abnormality monitoring system 100 is started up, the audio data is input from the audio input apparatus 1 to the audio information processing unit 6. Then, in step S1, the abnormality monitoring system 100 performs initialization processing. More specifically, the learning speed determination unit 12 sets the noise learning speed to be output from the learning speed determination unit 12 to "intermediate" as the initial setting thereof.

In step S2, the video input unit 10 holds (stores) the video information (the video data) input from the video input apparatus 2.

In step S3, the traffic condition detection unit analyzes the video information input from the video input unit 10 and acquires the number of cars in the video image, the speed at which each of the cars passes, and the frequency at which the cars pass, thereby detecting the traffic condition.

In step S4, the learning speed determination unit 12 determines a change in the traffic condition based on the detection result (the traffic condition) from the traffic condition detection unit 11.

For example, if there is a change in the traffic condition, such as a change from "normal" to "traffic jam ongoing" and a change from "high traffic volume" to "normal", the learning speed determination unit 12 determines that the traffic condition is changed (YES in step S4), and the processing proceeds to step S8. If the learning speed determination unit 12 determines that the traffic condition is not changed in step S4 (NO in step S4), the processing proceeds to step S5.

In step S5, the learning speed determination unit 12 determines whether the current setting of the learning speed is "high". If the current setting of the learning speed is "high" (YES in step S5), the processing proceeds to step S6. If the current setting of the learning speed is a setting other than that (NO in step S5), the processing proceeds to step S7.

In step S6, the learning speed determination unit determines whether a predetermined time period has elapsed with the abnormality monitoring system 100 kept in a state where the learning of the background noise is carried out at the learning speed set to "high". If the predetermined time period has elapsed (YES in step S6), the processing proceeds to step S9. If the predetermined time period has not elapsed yet (NO in step S6), the processing proceeds to step S8. In the case where the processing proceeds from step S6 to step S9 (YES in step S6), in the present embodiment, the above-described learning speed is lowered from "high" to "intermediate" if the above-described traffic condition is not changed for the predetermined time period.

In step S7, the learning speed determination unit 12 determines whether the imaging site is kept in a state where the traffic condition is not changed for a predetermined time period. If the imaging site is kept in the state where the traffic condition is not changed for the predetermined time period (YES in step S7), the processing proceeds to step S10. If the imaging site is not kept in the state where the traffic condition is not changed for the predetermined time period (NO in step S7), the processing proceeds to step S9. In the case where the processing proceeds from step S7 to step S10 (YES in step S7), in the present embodiment, the above-described learning speed is lowered from "intermediate" to "low" if the above-described traffic condition is not changed for the predetermined time period. This change of the learning speed can be said to be a change that slows down the current learning speed if the traffic condition is not changed for the predetermined time period.

In step S8, the learning speed determination unit sets the noise learning speed to "high" (changes the noise learning speed from "intermediate" to "high"). In other words, in the present embodiment, the learning speed is raised if the traffic condition is changed.

In step S9, the learning speed determination unit 12 sets the noise learning speed to "intermediate".

In step S10, the learning speed determination unit 12 sets the noise learning speed to "low". After step S8, S9, or S10, the processing proceeds to step S11.

In step S11, the timer unit 8 sets a timing at which the traffic condition detection unit 11 detects the traffic condition next time (i.e., a time-out period). The time-out period is, for example, 100 msec.

In step S12, the audio branch unit 14 divides the audio data input from the audio input unit 13 into the completely identical two pieces of audio data. These two pieces of audio data are pieces of audio data between which there is no difference and no deterioration in terms of the gain and the characteristic. Then, the audio branch unit 14 transmits one of the pieces of audio data to the noise learning unit 16, and transmits the other of the pieces of audio data to the noise removal unit 15.

In step S13, the noise learning unit 16 performs the noise learning processing on the audio data input from the audio branch unit 14. By the noise learning processing, the noise learning unit 16 determines (acquires) the frequency component and the subtraction amount of the noise.

In step S14, the noise removal unit 15 performs the noise removal processing on the audio data input from the audio branch unit 14 based on the frequency component and the subtraction amount of the noise that are input from the noise learning unit 16. Then, the noise removal unit 15 transmits the audio data after the noise removal (the audio data after the noise component is removed therefrom) to the abnormal sound detection processing unit 7.

In step S15, the abnormal sound detection processing unit 7 determines (detects) whether the abnormal sound data is contained in the audio data input from the noise removal unit 15 (the audio data after the noise component is removed therefrom). The abnormal sound detection processing unit 7 notifies the event notification unit 9 that the abnormal sound is detected, if the abnormal sound detection processing unit 7 detects the abnormal sound in this audio data. The event notification unit 9 issues (transmits) the notification indicating the detection of the abnormal sound (the occurrence of the abnormal sound) to the surveillance monitor apparatus 50 via the communication unit 3. In other words, if the abnormal sound is determined to be contained in the audio data after the noise component is removed therefrom, the event notification unit 9 transmits this determination result to the surveillance monitor apparatus 50, which is a monitoring apparatus.

In step S16, the abnormality monitoring system 100 determines whether the audio is input to the audio input unit 13. If the audio is input (YES in step S16), the processing proceeds to step S11. If the audio is not input (NO in step S16), the processing proceeds to step S17.

In step S17, the abnormality monitoring system 100 determines whether a not-illustrated abnormality monitoring system ON/OFF switch is operated to be switched off. If this switch is operated to be switched off (YES in step S17), the input of the audio from the audio input apparatus 1 to the audio input unit 13 is stopped, and the flowchart illustrated in FIG. 4 is ended. If the switch is not operated to be switched off (NO in step S17), the processing proceeds to step S18.

In step S18, the abnormality monitoring system 100 determines whether the timer unit 8 indicates the time-out (whether the time-out period has elapsed). If the timer unit 8 indicates the time-out (YES in step S18), the processing proceeds to step S2. If the timer unit 8 does not indicate the time-out (NO in step S18), the processing proceeds to step S16.

By this processing, the noise removal apparatus included in the abnormality monitoring system 100 can carry out the optimum learning (learning processing) of the background noise according to the traffic condition (a condition about how much the imaging site is congested with cars) acquired from the video data. Especially, in the present embodiment, the noise removal apparatus changes the learning speed of the entire noise learning (learning processing) from "intermediate" to "high" if the traffic condition is changed. The noise removal apparatus raises the learning speed if the traffic condition is changed, thereby allowing the learning speed to follow the change in the noise environment. Therefore, according to the noise removal apparatus according to the present embodiment, the noise removal can be carried out with improved accuracy, allowing the abnormal sound to be correctly detected. Further, the abnormality monitoring system 100 including such a noise removal apparatus can correctly monitor the abnormality.

The abnormality monitoring system 100 according to the present embodiment also can be used in the following usage.

For example, an abnormality monitoring system that monitors an abnormal sound in outdoor traffic may determine a current weather condition from the video image of the camera (the imaging apparatus), and change the noise learning speed and/or determine (change) whether to carry out the noise learning (the execution or the omission of the noise learning) according to a change in the weather condition. In other words, the condition in the imaging range that is used, for example, when the learning speed is changed may be a weather condition, such as a state of the atmosphere with respect to wind, temperature, cloudiness, moisture, pressure, etc., acquired from the video data of the camera.

Alternatively, an abnormality monitoring system that monitors an abnormal sound in a store may determine a condition about how much the store is crowded with people that is acquired from the video data, and change the noise learning speed and/or determine whether to carry out the noise learning according to a change in the condition about how much the store is crowded with people. In other words, the condition in the imaging range that is used, for example, when the learning speed is changed may be the condition about the extent or degree to which the store contains people that is acquired from the video data of the camera.

In the present embodiment, the abnormality monitoring system 100 is assumed to include the audio input apparatus 1, the video input apparatus 2, and the surveillance monitor apparatus 50, but may be configured in such a manner that the audio input apparatus 1, the video input apparatus 2, and the surveillance monitor apparatus 50 are not included in the components of the abnormality monitoring system 100.

Further, in the above-described embodiment, the learning speed is set to "intermediate" as the initial setting in step S1, but the learning speed may be set to a speed other than "intermediate" as the initial setting.

In the first embodiment, if the traffic condition is changed, the learning speed of the entire noise learning (learning processing) is changed from "intermediate" to "high". Embodiments are not limited to such an embodiment. For example, how to change the learning speed may be changed according to the frequency component contained in the background noise. Such an embodiment will be described as a second embodiment.

An abnormality monitoring system according to the second embodiment will be described with reference to FIGS. 5 to 7. An abnormality monitoring system 100B according to the second embodiment is an embodiment constructed by paying attention to the fact that the frequency component contained in the background noise at the traffic site is different depending on the traffic condition. In the second embodiment, the optimum noise learning (learning processing) according to the traffic condition is carried out based on the frequency component contained in the noise.

Figure 5:
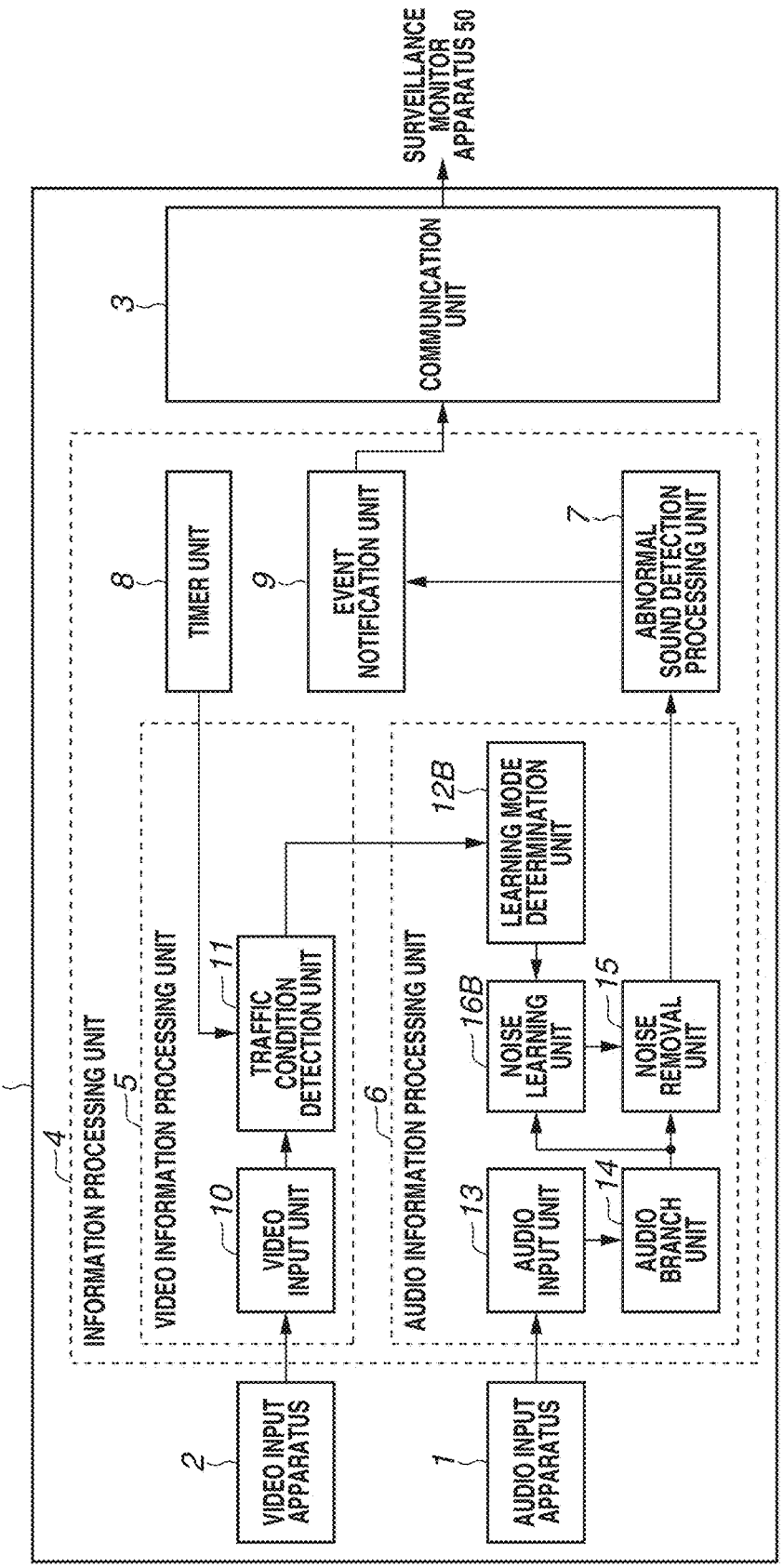
FIG. 5 is a functional block diagram of an abnormality monitoring system according to a second embodiment.

FIG. 5 illustrates a configuration diagram of functional blocks of the abnormality monitoring system 100B.

Similar to the abnormality monitoring system 100 according to the first embodiment, the abnormality monitoring system 100B according to the second embodiment is a system that monitors the abnormality in the traffic condition at the imaging site. If a crash sound or the like has occurred at the imaging site, the abnormality monitoring system 100B detects this sound as the abnormal sound, and issues the event notification to the surveillance monitor apparatus 50. As illustrated in FIG. 5, the abnormality monitoring system 100B includes a noise learning unit 16B instead of the noise learning unit 16 according to the first embodiment. A function of the noise learning unit 16B is different from the function of the noise learning unit 16. Further, the abnormality monitoring system 100B includes a learning mode determination unit 12B instead of the learning speed determination unit 12 according to the first embodiment. The second embodiment is similar to the first embodiment in terms of other functional configurations. In the following description, the second embodiment will be described, focusing on differences from the first embodiment.

Figure 6:
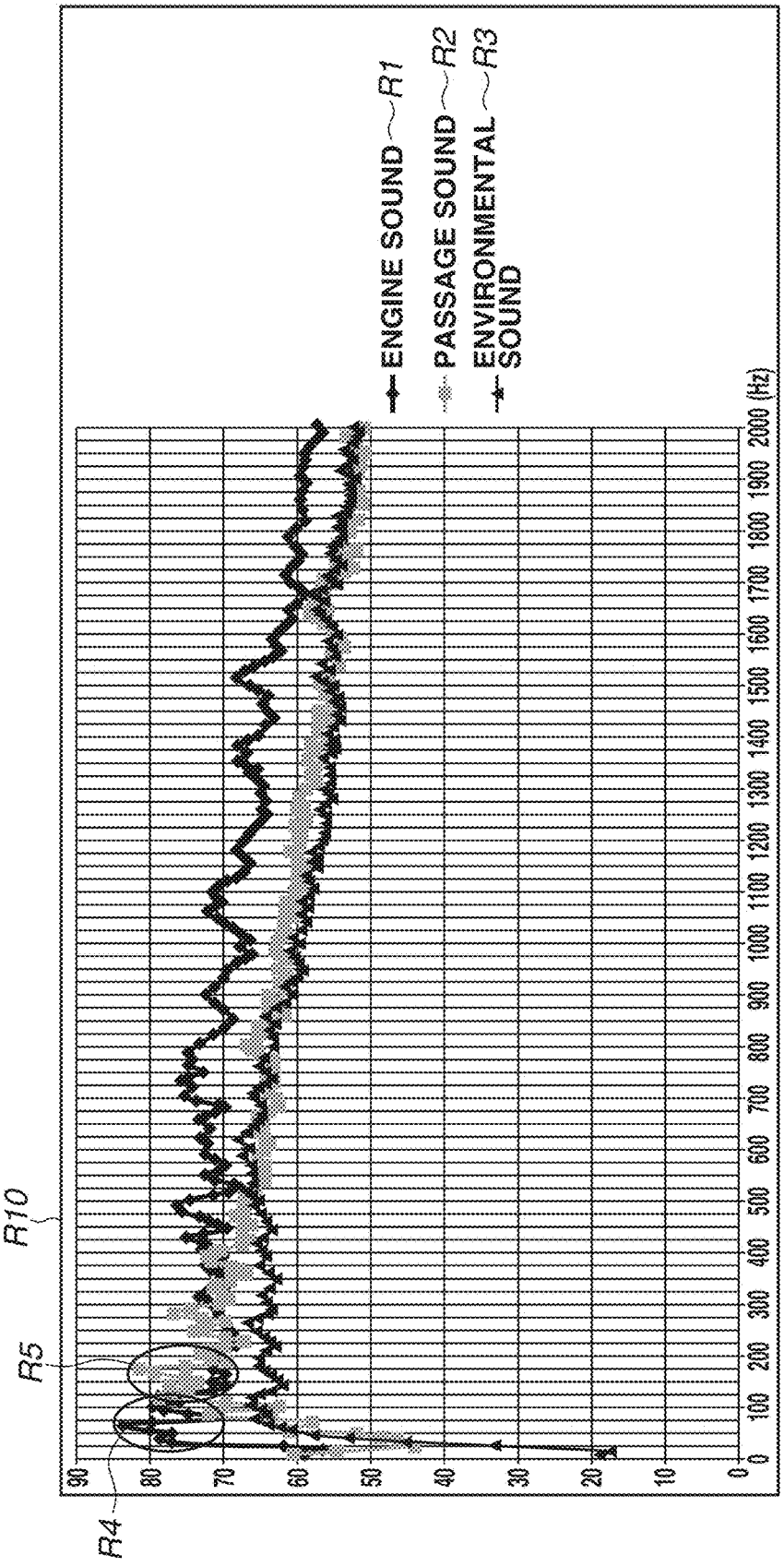
FIG. 6 is a spectrum chart illustrating a spectrum for each type of background noise according to the second embodiment.
Figure 7:
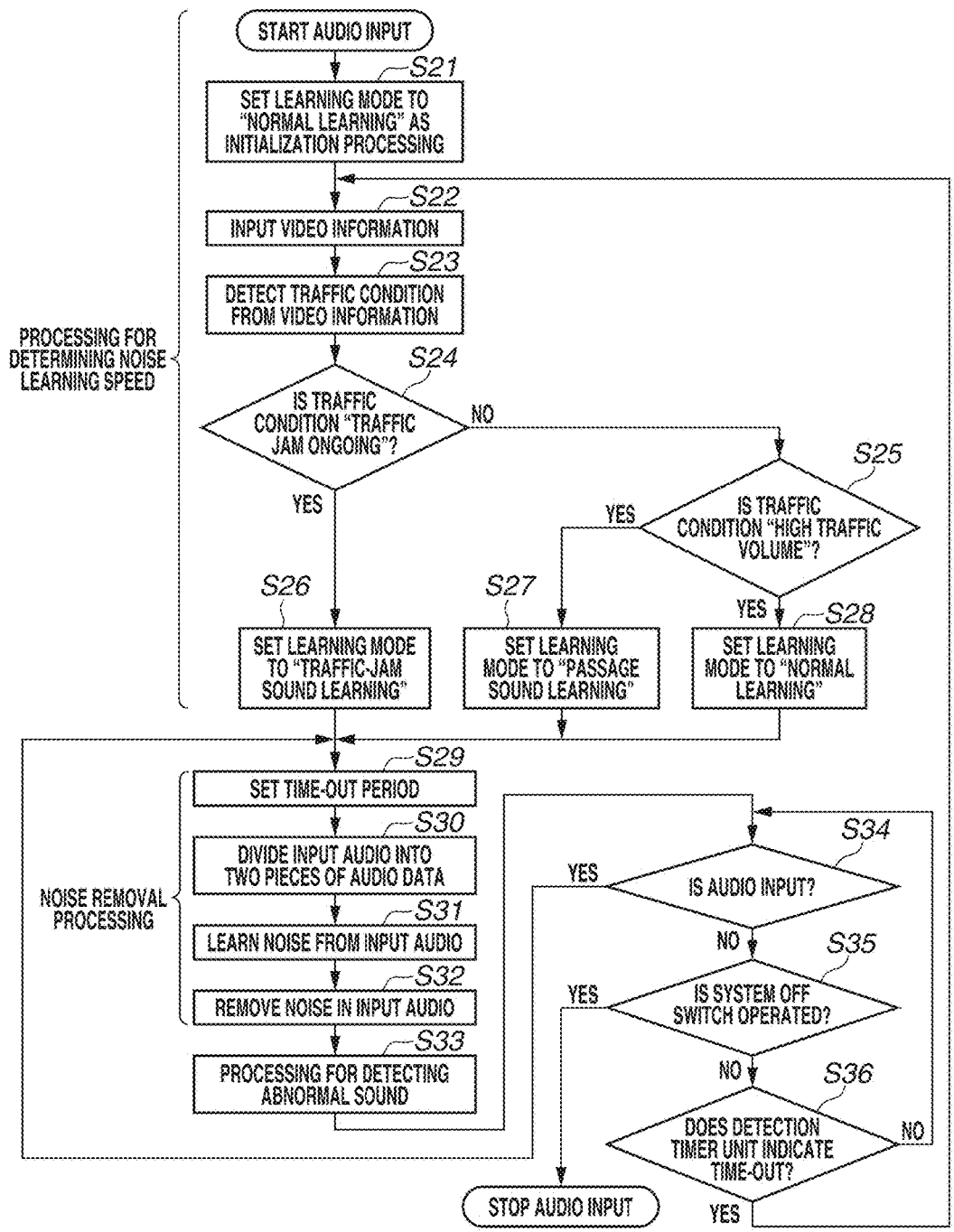
FIG. 7 is a flowchart illustrating a noise removal procedure performed by the abnormality monitoring system according to the second embodiment.

FIG. 6 illustrates a spectrum for each type of the background noise. A vertical axis and a horizontal axis in a graph illustrated in FIG. 6 represent a gain (the spectrum) (a unit thereof is dB) and a frequency (a unit thereof is Hz), respectively. As indicated in a spectrum chart R10, the background noise at the traffic site contains a frequency component that is different depending on the traffic condition thereof. In other words, the waveform of the background noise is different depending on the traffic condition. Therefore, the noise learning should be performed in an optimum manner according to the traffic condition. In the present embodiment, assume that the background noise is any of an engine sound R1, a passage sound R2, and an environmental sound R3. In other words, assume that the waveform of the background noise is any of three types of waveforms (R1, R2, and R3). The engine sound R1 is a background noise that occurs in a large amount during a traffic jam. The passage noise R2 is a background noise that occurs when the traffic volume is high. The environmental noise R3 is a background noise at normal times.

Compared to the environmental sound R3, the engine sound R1 contains a large number of low frequencies around 50 to 75 Hz (indicated by R4 in FIG. 6), and the passage sound R2 contains a large number of frequencies around 150 to 175 Hz (indicated by R5 in FIG. 6).

The learning mode determination unit 12B of the abnormality monitoring system 100B sets (selects) an optimum noise learning mode based on the traffic condition of cars (a congestion condition of the road) in the video image that is received from the traffic condition detection unit 11. In the present embodiment, the learning mode determination unit 12B sets the learning mode to "normal learning" if the traffic condition is "normal", and sets the learning mode to "traffic-jam sound learning" if the traffic condition is "traffic jam ongoing". Further, the learning mode determination unit 12B sets the learning mode to "passage sound learning" if the traffic condition is "high traffic volume". The learning mode determination unit 12B transmits the set noise learning mode to the noise learning unit 16B.

The noise learning unit 16B defines the background noise and the constantly occurring sound as the noise from the audio data received from the audio branch unit 14, learns the component thereof, and generates the frequency component and the subtraction amount at the time of the noise removal. The noise learning unit 16B transmits the frequency component and the subtraction amount at the time of the noise removal to the noise removal unit 15.

A noise learning method employed by the noise learning unit 16B is similar to that of the noise learning unit 16 according to the first embodiment. Further, a method for learning the frequency component of the constantly occurring audio according to the second embodiment also is similar to that of the first embodiment. A difference from the first embodiment is that the noise learning unit 16B according to the second embodiment determines the convergence speed of the gain value for each frequency based on the learning mode given from the learning mode determination unit 12B.

If the learning mode is "normal learning", the learning mode determination unit 12B sets the convergence speed for all of the frequencies so as to converge at a normal speed. Further, if the learning mode is "normal learning", the learning mode determination unit 12B sets the same convergence speed as the convergence speed for each frequency. If the learning mode is "traffic-jam sound learning", since the background noise contains a large number of frequencies around 50 to 75 Hz as indicated by R4 in FIG. 6, the learning mode determination unit 12B sets the convergence speed of the gain of the adaptive filter for this frequency band to a higher speed than the normal speed. In other words, in the present embodiment, the noise removal apparatus does not change the learning speed of the entire noise learning but changes only the learning speed of a part of the noise learning. More specifically, the noise removal apparatus changes the learning speed of the learning processing based on the frequency of the noise component.

On the other hand, if the learning mode is "passage sound learning", since the background noise contains a large number of frequencies around 150 to 175 Hz as indicated by R5 in FIG. 6, the learning mode determination unit 12B sets the convergence speed of the gain of the adaptive filter for this frequency band to a high speed.

In this manner, in the second embodiment, the convergence speed of the adaptive filter for a specific frequency band is changed according to the learning mode.

The second embodiment may include not only changing the convergence speed of the adaptive filter for the specific frequency band, but also invalidating convergence for a frequency band that does not contain the noise component of loud noise or the passage sound.

Next, a noise removal procedure performed by the abnormality monitoring system 100B illustrated in FIG. 5 will be described with reference to a flowchart illustrated in FIG. 7. In the present embodiment, the current traffic condition is determined based on the video image input from the video input apparatus 2, and the noise learning speed is changed for each frequency according to this determination. The flowchart illustrated in FIG. 7 is started when the audio data is input from the audio input apparatus 1 to the audio information processing unit 6.

When the abnormality monitoring system 100B is started up, the audio data is input from the audio input apparatus 1 to the audio information processing unit 6. Then, in step S21, the abnormality monitoring system 100B performs initialization processing. More specifically, the learning mode determination unit 12B sets the learning mode to be output from the learning mode determination unit 12B to "normal learning" as an initial setting thereof.

Step S22 is similar to step S2 according to the first embodiment. Further, step S23 also is similar to step S3 according to the first embodiment.

In step S24, the learning mode determination unit 12B determines whether the traffic condition is "traffic jam ongoing" based on the detection result (the traffic condition) from the traffic condition detection unit 11. If the learning mode determination unit 12B determines that the traffic condition is "traffic jam ongoing" (YES in step S24), the processing proceeds to step S26. If not (NO in step S24), the processing proceeds to step S25.

In step S25, the learning mode determination unit 12B determines whether the traffic condition detected by the traffic condition detection unit 11 is "high traffic volume". If the detected traffic condition is "high traffic volume" (YES in step S25), the processing proceeds to step S27. If not (NO in step S25), the processing proceeds to step S28.

In step S26, the learning mode determination unit 12B sets the noise learning mode to "traffic-jam sound learning". In other words, in the present embodiment, if the traffic condition is "traffic jam ongoing" (YES in step S24), the learning mode is changed from "normal learning", which is the initial setting, to "traffic-jam sound learning".

In step S27, the learning mode determination unit 12B sets the noise learning mode to "passage sound learning". In other words, in the present embodiment, if the traffic condition is "high traffic volume" (YES in step S25), the learning mode is changed from "normal learning", which is the initial setting, to "passage sound learning".

In step S28, the learning mode determination unit 12B sets the noise learning mode to "normal learning". After step S26, S27, or S28, the processing proceeds to step S29.

Steps S29 to S36 are similar to steps S11 to S18 according to the first embodiment (FIG. 4), respectively.

By this processing, the abnormality monitoring system 100B according to the second embodiment can carry out the optimum learning of the background noise according to the traffic condition, thereby improving the accuracy of the noise removal, allowing the abnormal sound to be correctly detected. Especially, in the second embodiment, the learning speed is changed based on the frequency of the noise component, whereby the noise removal can be elaborately carried out.

Further, the abnormality monitoring system 100B according to the present embodiment can be used in the following usage.

For example, the abnormality monitoring system that monitors the abnormal sound in the outdoor traffic may determine the current weather condition from the video image of the camera, and change the noise learning speed and/or determine (change) whether to carry out the learning for each frequency according to the weather condition.

Alternatively, the abnormality monitoring system that monitors the abnormal sound in the store may determine the condition about how much the store is crowded with people that is acquired from the video data, and change the noise learning speed and/or determine whether to carry out the learning for each frequency according to the condition about how much the store is crowded with people (the change therein).

In the second embodiment, the noise learning mode is selected (changed) according to the traffic condition, paying attention to the frequency component contained in the background noise. The present embodiment is not limited to such an embodiment. For example, the learning mode may be selected (changed) so as to allow the learning speed to follow the change in the noise environment if the surrounding noise environment is largely changed. Such an embodiment will be described as a third embodiment.

An abnormality monitoring system according to the third embodiment will be described with reference to FIGS. 5, 6, and 8. A functional configuration diagram of the abnormality monitoring system according to the third embodiment is similar to that of the second embodiment (FIG. 5). However, respective functions of the noise learning unit 16B and the learning mode determination unit 12B according to the third embodiment are different from those of the second embodiment. Further, assume that five modes are prepared as selectable (settable) learning modes. More specifically, the learning modes settable in the third embodiment are "traffic-jam sound learning", "passage sound learning", "normal learning", "high", and "non-learning".

If the learning mode is "high", the learning mode determination unit 12B sets the convergence speed for all of the frequencies to a high speed. If the learning mode is "non-learning", the learning mode determination unit 12B sets the learning mode so as to refrain from carrying out the noise learning. If the learning mode is "traffic-jam sound learning", "passage sound learning", or "normal learning", the noise learning unit 16B carries out the learning having the same contents as "traffic-jam sound learning", "passage sound learning", and "normal learning" described in the description of the second embodiment. In the following description, the third embodiment will be described, focusing on differences from the second embodiment.

The learning mode determination unit 12B according to the third embodiment sets (selects) the optimum noise learning mode based on the change in the traffic condition of cars in the video image that is received from the traffic condition detection unit 11. More specifically, the learning mode determination unit 12B sets the learning mode to "high" if the traffic condition is changed to "normal", and sets the learning mode to "traffic-jam sound learning" if the traffic condition is changed to "traffic jam ongoing". On the other hand, the learning mode determination unit 12B sets the learning mode to "passage sound learning" if the traffic condition is changed to "high traffic volume". The setting is changed in this manner for the following reason. If the traffic condition is changed after the learning mode is set, the present embodiment is configured to determine (assume) that the surrounding noise environment is largely changed, and set the learning mode so as to allow the learning speed to follow the change in the noise environment. The change in the traffic condition is, for example, the change from "high traffic volume" to "normal", or the change from "normal" to "traffic jam ongoing".

In the present embodiment, if the traffic condition is not changed for a predetermined time period with the learning mode set to "high", "traffic-jam sound learning", or "passage sound learning", the change in the noise environment is determined to be subsided, and the learning mode determination unit 12B sets the learning mode back to "normal learning" to prevent excessive noise learning.

Further, if the traffic condition is not changed for a predetermined time period with the learning mode set to "normal learning", the imaging site is determined to be in the stationary state where the noise environment is hardly changed, and the learning mode determination unit 12B sets the learning mode to "non-learning" so as to prevent audio other than the noise from being unintentionally learned.

The noise learning unit 16B defines the background noise and the constantly occurring sound as the noise from the audio data received from the audio branch unit 14, learns the component thereof, and generates the frequency component and the subtraction amount at the time of the noise removal. The noise learning unit 16B transmits the frequency component and the subtraction amount at the time of the noise removal to the noise removal unit 15.

A noise learning method is similar to that of the second embodiment. A method for learning the frequency component of the constantly occurring audio also is similar to that of the second embodiment. Then, similar to the second embodiment, the convergence speed of the gain value is determined for each frequency based on the learning mode given from the learning mode determination unit 12B.

Next, a noise removal procedure performed by the abnormality monitoring system according to the present embodiment will be described with reference to a flowchart illustrated in FIG. 8 (consisting of FIGS. 8A and 8B). In the present embodiment, the current traffic condition is determined based on the video image input from the video input apparatus 2, and the optimum noise learning is carried out according to this determination. The flowchart illustrated in FIG. 8 is started when the audio data is input from the audio input apparatus 1 to the audio information processing unit 6.

Steps S41 to S43 are similar to steps S21 to S23 according to the second embodiment, respectively.

In step S44, the learning mode determination unit 12B determines whether the traffic condition is changed based on the detection result (the traffic condition) from the traffic condition detection unit 11. For example, if the traffic condition is changed from "normal" to "traffic jam ongoing", or is changed from "high traffic volume" to "normal", the learning mode determination unit 12B determines that the traffic condition is changed (YES in step S44), and then the processing proceeds to step S47. If the learning mode determination unit 12B determines that the traffic condition is not changed (NO in step S44), the processing proceeds to step S45.

In step S45, the learning mode determination unit 12B determines whether the current setting of the learning mode is "normal learning" or "non-learning". If the learning mode determination unit 12B determines that the current setting of the learning mode is "normal learning" or "non-learning" (YES in step S45), the processing proceeds to step S49. If the learning mode determination unit 12B determines that the current setting of the learning mode is a setting other than that (NO in step S45), the processing proceeds to step S46.

In step S46, the learning mode determination unit 12B determines whether the abnormality monitoring system is kept in a state where the learning of the background noise is carried out for a predetermined time period (whether the predetermined time period has elapsed with this state maintained). If the learning mode determination unit 12B determines that the predetermined time period has elapsed (YES in step S46), the processing proceeds to step S53. If the predetermined time period has not elapsed yet (NO in step S46), the processing proceeds to step S47.

In step S47, the learning mode determination unit 12B determines whether the traffic condition is "traffic jam ongoing" based on the detection result (the traffic condition) from the traffic condition detection unit 11. If the learning mode determination unit 12B determines that the traffic condition is "traffic jam ongoing" (YES in step S47), the processing proceeds to step S50. If not (NO in step S47), the processing proceeds to step S48.

In step S48, the learning mode determination unit 12B determines whether the traffic condition is "high traffic volume" based on the detection result (the traffic condition) from the traffic condition detection unit 11. If the learning mode determination unit 12B determines that the traffic condition is "high traffic volume" (YES in step S48), the processing proceeds to step S51. If not (NO in step S48), the processing proceeds to step S52.

In step S49, the learning mode determination unit 12B determines whether the imaging site is kept in the state where the traffic condition is not changed for a predetermined time period. In other words, the learning mode determination unit 12B determines whether the road condition is not changed for the predetermined time period. If the imaging site is kept in the state where the road condition is not changed for the predetermined time period (YES in step S49), the processing proceeds to step S54. If not (NO in step S49), the processing proceeds to step S53.

In step S50, the learning mode determination unit 12B sets the noise learning mode to "traffic-jam sound learning". In other words, in the present embodiment, if the traffic condition is changed to "traffic jam ongoing" (YES in step S47), the learning mode is changed from "normal learning", which is the initial setting, to "traffic-jam sound learning".

In step S51, the learning mode determination unit 12B sets the noise learning mode to "passage sound learning". In other words, in the present embodiment, if the traffic condition is changed to "high traffic volume" (YES in step S48), the learning mode is changed from "normal learning", which is the initial setting, to the "passage sound learning".

In step S52, the learning mode determination unit 12B sets the noise learning mode to "high". In other words, in the present embodiment, if the traffic condition is changed to a condition other than "traffic jam ongoing" and "high traffic volume" (NO in step S47 and NO in step S48), the learning mode is changed from "normal learning", which is the initial setting, to "high".

In step S53, the learning mode determination unit 12B sets the noise learning mode to "normal learning".

In step S54, the learning mode determination unit 12B sets the noise learning mode to be output from the learning mode determination unit 12B to "non-learning". After step S50, S51, S52, S53, or S54, the processing proceeds to step S55.

Steps S55 to S62 are similar to steps S29 to S36 according to the second embodiment (FIG. 7), respectively.

By this processing, the abnormality monitoring system can carry out the optimum learning of the background noise according to the traffic condition (the congestion condition of the road), thereby improving the accuracy of the noise removal, and allowing the abnormal noise to be correctly detected.

Further, the abnormality monitoring system according to the present embodiment also can be used in the following usage.

For example, the abnormality monitoring system that monitors the abnormal sound in the outdoor traffic may determine the current weather condition from the video image of the camera, and change the learning speed and/or determine (change) whether to carry out the noise learning for the entire noise learning or for each frequency according to the change in the weather condition.

Alternatively, the abnormality monitoring system that monitors the abnormal sound in the store may determine a degree about how much the store is crowded with people that is acquired from the video data, and change the learning speed and/or determine (change) whether to carry out the noise learning for the entire noise learning or for each frequency according to the change in the condition about how much the store is crowded with people.

<Hardware Configuration of Abnormality Monitoring System>

FIG. 9 illustrates an example of a hardware configuration of the abnormality monitoring system 100. As illustrated in FIG. 9, the abnormality monitoring system 100 includes an imaging apparatus 101, the CPU 102, a random access memory (RAM) 103, the ROM 104, a storage medium 105, a display unit 106, an operation unit 107, a communication unit 108, a sound pickup apparatus 109, and an antenna 108a.

The imaging apparatus 101 includes an optical system (a lens, a shutter, and a diaphragm), and an image sensor. The optical system forms a light image of a subject on the image sensor with an appropriate light amount at an appropriate timing. The image sensor converts the light image received via the optical system into the image (the video image). The imaging apparatus 101 is, for example, a camera installed at a side of the road, and images the predetermined imaging range on the road to generate the video data of cars running in this predetermined imaging range. The imaging apparatus 101 corresponds to the video input apparatus 2 illustrated in FIG. 1.

The CPU 102 carries out various kinds of calculations and controls each of the units included in the abnormality monitoring system 100 according to the input signal and the program. More specifically, the CPU 102 is in charge of imaging control, learning control, display control, storage control, communication control, and the like. The functional blocks illustrated in FIG. 1 are illustration of the functions implemented by the CPU 102.

The RAM 103 stores temporary data, and is used for the work of the CPU 102. The ROM 104 stores the program for executing each of the functional units illustrated in FIG. 1, and various kinds of setting information.

The storage medium 105 stores the video data and the like. The storage medium 105 is, for example, an attachable/detachable memory card, and allows data to be read out therefrom while being attached to a personal computer (PC)

or the like. The abnormality monitoring system 100 includes a unit for accessing the storage medium 105, and can read and write data from and into the storage medium 105.

The display unit 106 displays, for example, the video image and characters for an interactive operation. However, the abnormality monitoring system 100 does not necessarily have to include the display unit 106.

The operation unit 107 is used to receive a user's operation. The operation unit 107 includes, for example, a button, a lever, and a touch panel. The operation unit 107 includes the abnormality monitoring system ON/OFF switch.

The communication unit 108 communicates (carries out wireless or wired communication) with the surveillance monitor apparatus 50 via a wireless local area network (LAN). In the case where the communication is the wireless communication, the communication unit 108 uses the antenna 108a.

The sound pickup apparatus 109 is a unit that picks up an external sound (e.g., a microphone). More specifically, the sound pickup apparatus 109 picks up the audio accompanying the imaging by the imaging apparatus 101. The sound pickup apparatus 109 picks up the sound in and around the predetermined imaging range, and generates the audio data. The generated audio data is stored in the storage medium 105. The sound pickup apparatus 109 corresponds to the audio input apparatus 1 illustrated in FIG. 1.

Regarding the control by the abnormality monitoring system 100, a single hardware device may perform it, or a plurality of hardware devices may function as the units that perform the processing in the abnormality monitoring system 100 while dividing the processing among them.

The abnormality monitoring system 100 may be unequipped with the imaging apparatus 101. In this case, the abnormality monitoring system 100, more specifically the video input unit 10, receives the video image from an external imaging apparatus.

Further, the abnormality monitoring system 100 may be unequipped with the communication unit 108. In this case, the abnormality monitoring system 100, more specifically the event notification unit 9, is directly connected to the surveillance monitor apparatus 50 via, for example, a wired connection.

The abnormality monitoring system 100 may be unequipped with the sound pickup apparatus 109. In this case, the abnormality monitoring system 100, more specifically the audio input unit 13, acquires the audio data from an external sound pickup apparatus.

In the first to third embodiments, the abnormality monitoring system including the noise removal apparatus has been described, but the noise removal apparatus also can be included in another kind of system.

Other Embodiments

Embodiments also can be realized by processing that supplies a program capable of achieving one or more functions of the above-described embodiments to a system or an apparatus via a network or a storage medium, and causes one or more processors in a computer of this system or apparatus to read out and execute the program. The program is a computer program. Further, embodiments also can be realized with use of a circuit (for example, an ASIC) capable of achieving one or more functions.

Further, an audio processing system may be formed from the noise removal apparatus, the imaging apparatus that images the predetermined imaging range and generates the video data, and the sound pickup apparatus that picks up the audio accompanying the above-described video data and generates the audio data.

According to the above-described respective embodiments, the noise removal can be accurately carried out even when the noise environment is changed at the time of the noise removal from the audio.

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-018417, filed Feb. 2, 2016, which is hereby incorporated by reference herein in its entirety.

What is claimed is:

1. An audio processing apparatus comprising:
   an input unit configured to receive sound data picked up by a sound pickup apparatus and receive an image captured by an imaging apparatus that corresponds to the sound pickup apparatus;
   a detection unit configured to detect, from the received image, a condition of an imaging target in the received image;
   a learning speed determination unit configured to set a learning speed;
   a noise learning unit configured to perform noise component extraction processing to extract a noise component from the received sound data and perform learning processing at the set learning speed; and
   a removal unit configured to remove a noise component from the received sound data based on the extracted noise component,
   wherein, after the learning speed determination unit sets a first learning speed and to adapt the noise component extraction processing to the received sound data, the learning speed determination unit causes the noise learning unit to change the speed at which learning processing is performed by changing the first learning speed to a second learning speed, that is different from the first learning speed, based on the detected imaging target condition.

2. The audio processing apparatus according to claim 1, wherein the detection unit detects that imaging target condition over a predetermined time period,
wherein the learning speed determination unit changes the first learning speed to the second learning speed based on a change in the imaging target condition detected over the predetermined time period,
wherein the learning speed determination unit determines that the imaging target condition is changed in a case where the number of specific targets contained in the image increases to be larger than a predetermined threshold value, and
wherein the speed of the second learning speed is higher than the first learning speed.

3. The audio processing apparatus according to claim 1, wherein the learning speed determination unit changes the first learning speed to the second learning speed based on a change in the imaging target condition,
wherein the learning speed determination unit determines that the imaging target condition is changed in a case where a vehicle speed of a specific target contained in the image increases to be higher than a predetermined threshold value, and
wherein the speed of the second learning speed is higher than the first learning speed.

4. The audio processing apparatus according to claim 1, wherein the noise learning unit perform noise component extraction processing using an adaptive filter on the sound data and changes a coefficient of the adaptive filter according to the second learning speed.

5. The audio processing apparatus according to claim 1, wherein the learning speed determination unit changes the first learning speed to the second learning speed in a case where the imaging target condition is not changed for a predetermined time period, and
wherein the speed of the second learning speed is lower than the first learning speed.

6. The audio processing apparatus according to claim 1, wherein the learning speed determination unit changes the learning speed of the learning processing based on a frequency of the noise component.

7. The audio processing apparatus according to claim 1, wherein the learning speed determination unit changes the first learning speed to the second learning speed based on a change in the imaging target condition, and
wherein the speed of the second learning speed is higher than the first learning speed such that the noise learning unit employs a high learning speed as the learning speed at which the noise component extraction processing is adapted to the sound data in the learning processing in a case where the imaging target condition of the imaging target is changed.

8. The audio processing apparatus according to claim 1, wherein the learning speed determination unit changes the first learning speed to the second learning speed in a case where the imaging target condition is not changed for a predetermined time period, and
wherein the speed of the second learning speed is lower than the first learning speed such that the noise learning unit employs a low learning speed as the learning speed at which the noise component extraction processing is adapted to the sound data in the learning processing in a case where the imaging target condition of the imaging target is not changed for the predetermined time period.

9. The audio processing apparatus according to claim 1, wherein the imaging target condition of the imaging target is an automobile traffic condition determined based on the image captured by the imaging apparatus.

10. The audio processing apparatus according to claim 1, wherein the imaging target condition of the imaging target is a weather condition determined based on the image captured by the imaging apparatus.

11. The audio processing apparatus according to claim 1, wherein the imaging target condition of the imaging target is a condition regarding how much the imaging target is crowded with people determined based on the image captured by the imaging apparatus.

12. The audio processing apparatus according to claim 1, further comprising:
a determination unit configured to determine, after the removal unit removes the noise component from the sound data, whether a specific sound is contained in the sound data not having the noise component; and
a transmission unit configured to transmit a determination result from the determination unit to an external apparatus in a case where the determination unit determines that the specific sound is contained in the sound data not having the noise component.

13. A method for an audio processing apparatus, the method comprising:
receiving sound data picked up by a sound pickup apparatus and receiving an image captured by an imaging apparatus that corresponds to the sound pickup apparatus;
detecting, from the received image, a condition of an imaging target in the received image;
setting a learning speed via a learning speed determination unit;
performing, via a noise learning unit, noise component extraction processing to extract a noise component from the received sound data and performing, via the noise learning unit, learning processing at the set learning speed; and
removing a noise component from the received sound data based on the extracted noise component,
wherein, after a first learning speed is set and to adapt the noise component extraction processing to the received sound data, the learning speed determination unit causes the noise learning unit to change the speed at which learning processing is performed by changing the first learning speed to a second learning speed, that is different from the first learning speed, based on the detected imaging target condition.

14. A non-transitory recording medium storing a program to cause an audio processing apparatus to perform a method, the method comprising:
receiving sound data picked up by a sound pickup apparatus
and receiving an image captured by an imaging apparatus that corresponds to the sound pickup apparatus;
detecting, from the received image, a condition of an imaging target in the received image;
setting a learning speed via a learning speed determination unit;
performing, via a noise learning unit, noise component extraction processing to extract a noise component from the received sound data and performing, via the noise learning unit, learning processing at the set learning speed; and removing a noise component from the received sound data based on the extracted noise component, wherein, after a first learning speed is set and to adapt the noise component extraction processing to the received sound data, the learning speed determination unit causes the noise learning unit to change the speed at which learning processing is performed by changing the first learning speed to a second learning speed, that is different from the first learning speed, based on the detected imaging target condition.

* * * * *